US010158690B2

(12) United States Patent
Vedula et al.

(10) Patent No.: US 10,158,690 B2
(45) Date of Patent: Dec. 18, 2018

(54) METHOD AND SYSTEM FOR STREAMING MULTIMEDIA CONTENT IN A WIRELESS FIDELITY DISPLAY NETWORK ENVIRONMENT

(71) Applicant: Samsung Electronics Co., Ltd., Gyeonggi-do (KR)

(72) Inventors: Kiran Bharadwaj Vedula, Bangalore (IN); Venkateswar Jeedigunta, Bangalore (IN); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 127 days.

(21) Appl. No.: 14/426,840

(22) PCT Filed: Sep. 30, 2013

(86) PCT No.: PCT/KR2013/008732
§ 371 (c)(1),
(2) Date: Mar. 10, 2015

(87) PCT Pub. No.: WO2014/051403
PCT Pub. Date: Apr. 3, 2014

(65) Prior Publication Data
US 2015/0222688 A1    Aug. 6, 2015

(30) Foreign Application Priority Data

Sep. 28, 2012 (IN) .......................... 4085/CHE/2012

(51) Int. Cl.
*H04L 29/06* (2006.01)
*H04W 76/10* (2018.01)
(Continued)

(52) U.S. Cl.
CPC ........ *H04L 65/607* (2013.01); *H04L 65/1069* (2013.01); *H04L 65/4084* (2013.01);
(Continued)

(58) Field of Classification Search
CPC ............ H04N 21/43637; H04L 65/607; H04L 65/608; H04L 69/18; G06F 3/1423; G06F 15/16
(Continued)

(56) References Cited

U.S. PATENT DOCUMENTS 7,656,835 B2 * 2/2010 Joutsenvirta .......... H04W 28/18
370/310
2002/0181495 A1 * 12/2002 Requena ................. H04L 29/06
370/465
(Continued)

FOREIGN PATENT DOCUMENTS

| CN | 101180876 | 5/2008 |
| CN | 102223201 | 10/2011 |
| WO | WO 2012037400 | 3/2012 |

OTHER PUBLICATIONS

PCT/ISA/237 Written Opinion issued on PCT/KR2013/008732 (pp. 4).
(Continued)

*Primary Examiner* — Tesfay Yohannes
(74) *Attorney, Agent, or Firm* — The Farrell Law Firm, P.C.

(57) ABSTRACT

A method and system for streaming multimedia content in a Wireless Fidelity (Wi-Fi) Display (WFD) network environment are provided. The method includes establishing a Wi-Fi display session with at least one Wi-Fi sink device by a Wi-Fi source device prior to capability negotiation with the at least one Wi-Fi sink device; streaming multimedia content to the at least one Wi-Fi sink device using a basic codec format during the Wi-Fi display session; performing capability negotiation with the at least one Wi-Fi sink device substantially simultaneously with streaming the multimedia content using the basic codec format during the Wi-Fi display session; and seamlessly continuing to stream the
(Continued)

multimedia content to the at least one Wi-Fi sink device using a codec format negotiated during the capability negotiation.

16 Claims, 10 Drawing Sheets (51) Int. Cl.
H04W 76/02 (2009.01)
H04W 8/20 (2009.01)
(52) U.S. Cl.
CPC ............... H04L 65/60 (2013.01); H04W 8/20 (2013.01); H04W 76/02 (2013.01); H04W 76/10 (2018.02)
(58) Field of Classification Search
USPC .................................. 709/219, 231; 370/252
See application file for complete search history.

(56) References Cited

U.S. PATENT DOCUMENTS

| | | | |
|---|---|---|---|
| 2003/0084106 A1* | 5/2003 | Erev | H04L 29/06027 709/206 |
| 2003/0207698 A1* | 11/2003 | Shpak | H04L 47/245 455/525 |
| 2006/0056311 A1* | 3/2006 | Han | H04L 29/12311 370/252 |
| 2007/0076591 A1* | 4/2007 | Khan | H04L 12/4625 370/216 |
| 2008/0195748 A1 | 8/2008 | Tierney et al. | |
| 2008/0303888 A1 | 12/2008 | Hansson | |
| 2011/0107388 A1 | 5/2011 | Lee et al. | |
| 2011/0125913 A1 | 5/2011 | Maes | |
| 2011/0320627 A1 | 12/2011 | Landow et al. | |
| 2012/0226674 A1 | 9/2012 | Channabasavaiah et al. | |
| 2013/0022100 A1 | 1/2013 | Liao et al. | |
| 2013/0223539 A1* | 8/2013 | Lee | H04L 65/607 375/240.25 |
| 2013/0227084 A1* | 8/2013 | Kim | H04L 65/60 709/219 |
| 2014/0096165 A1* | 4/2014 | Bei | H04N 19/46 725/81 |
| 2014/0335870 A1* | 11/2014 | Yilmaz | H04W 36/32 455/441 |
| 2015/0036695 A1* | 2/2015 | Gowda | H04L 47/283 370/474 |
| 2015/0066922 A1* | 3/2015 | Xiong | G06F 17/30038 707/736 |
| 2015/0067186 A1* | 3/2015 | Kuhn | H04L 65/607 709/231 |

OTHER PUBLICATIONS

PCT/ISA/210 Search Report issued on PCT/KR2013/008732 (pp. 3).
Wi-Fi Alliance, Wi-Fi Certified Miracast, Extending the Wi-Fi Experience to Seamless Video Display, Sep. 19, 2012, 18 pages.
Chinese Office Action dated Sep. 30, 2017 issued in counterpart application No. 201380050370.X, 21 pages.

* cited by examiner

METHOD AND SYSTEM FOR STREAMING MULTIMEDIA CONTENT IN A WIRELESS FIDELITY DISPLAY NETWORK ENVIRONMENT

PRIORITY

This application is a National Phase Entry of PCT International Application No. PCT/KR2013/008732, which was filed on Sep. 30, 2013, and claims priority to Indian Patent Application No. 4085/CHE/2012, which was filed in the Indian Intellectual Property Office on Sep. 28, 2012, the entire content of each of which is incorporated herein by reference.

BACKGROUND OF THE INVENTION

1. Field of the Invention

The present invention generally related to the field of Wireless Fidelity (Wi-Fi) network, and more particularly, to streaming multimedia content in a Wi-Fi Display network environment.

2. Description of the Related Art

Recently, a Wireless Fidelity (Wi-Fi) Display (WFD) standard has been newly defined based on a requirement to transmit audio/video (AV) data while high quality and low latency are satisfied. A WFD network is a network system suggested by the Wi-Fi Alliance® that enables Wi-Fi devices to be connected to each other in a peer-to-peer fashion without participating in a home network, an office network, or a hot-spot network. Wi-Fi devices within a WFD network may be capable of discovering information regarding each other (e.g., capability information), establishing a WFD session, and rendering content received during the WFD session. Typically, a WFD network comprises a Wi-Fi source device and one or more Wi-Fi sink devices.

A Wi-Fi source device acts as a multi-media content provider device. A primary Wi-Fi sink device is capable of rendering both audio and video streams, whereas a secondary Wi-Fi sink device can render an audio stream. In order to stream multi-media content, the Wi-Fi source device discovers WFD sink devices (e.g., primary Wi-Fi sink device and secondary Wi-Fi sink device). Then, the Wi-Fi source device performs service discovery with the WFD sink devices to determine the type of services desired to be availed at the WFD sink devices. Thereafter, the Wi-Fi source device establishes a Transport Control Protocol (TCP) connection with one or more of the discovered Wi-Fi sink devices.

The Wi-Fi source device sends a WFD capability request frame to the Wi-Fi sink devices over the TCP connection. In response, the Wi-Fi sink devices send a WFD capability response frame. The WFD capability response frame contains capability information and audio and video intent value associated with the respective WFD sink device. Accordingly, capability information is exchanged and negotiated between the Wi-Fi source device and each of the Wi-Fi sink devices over the TCP connection. For example, capability information exchanged and negotiated between the WFD source device and each of the WFD sink devices includes audio/video parameters such as audio/video codecs, resolutions, frames per second, time synchronization parameters, and so on. Then, the Wi-Fi source device establishes a WFD session with the multiple WFD sink devices. Furthermore, the Wi-Fi source device streams multimedia content to the multiple WFD sink devices during the WFD session.

After terminating a WFD session, the TCP connection between the Wi-Fi source device and the multiple Wi-Fi sink devices is terminated. In such a case, a new TCP connection has to be established between the Wi-Fi source device and the multiple Wi-Fi sink devices for every session. It is also possible that some other applications would have already started a TCP connection but may not use the TCP connection. However, setting up a new TCP connection adds to latency in streaming multimedia content. Upon availability of the TCP connection, capability exchange and negotiation is performed prior to establishing a WFD session, thereby introducing additional latency in establishing the WFD session.

SUMMARY OF THE INVENTION

The present invention has been made to address at least the above-mentioned problems and/or disadvantages and to provide at least the advantages described below.

Accordingly, an aspect of the present invention is to provide a method and system for streaming multimedia content in a Wireless Fidelity (Wi-Fi) Display (WFD) network environment.

In accordance with an aspect of the present invention, a method of streaming multimedia content in a Wireless Fidelity (Wi-Fi) Display (WFD) network environment is provide. The method includes establishing a Wi-Fi display session with at least one Wi-Fi sink device by a Wi-Fi source device prior to capability negotiation with the at least one Wi-Fi sink device; streaming multimedia content to the at least one Wi-Fi sink device using a basic codec format during the Wi-Fi display session; performing capability negotiation with the at least one Wi-Fi sink device substantially simultaneously with streaming the multimedia content using the basic codec format during the Wi-Fi display session; and seamlessly continuing to stream the multimedia content to the at least one Wi-Fi sink device using a codec format negotiated during the capability negotiation.

In accordance with another aspect of the present invention, an apparatus is provided, which includes a control unit; and a Wireless Fidelity (Wi-Fi) module coupled to the control unit. The control unit is configured for establishing a Wi-Fi display session with at least one Wi-Fi sink device prior to capability negotiation with the at least one Wi-Fi sink device. The control unit is configured for streaming multimedia content to the at least one Wi-Fi sink device according to a basic codec format during the Wi-Fi display session via the Wi-Fi module. The control unit is configured for performing capability negotiation with the at least one Wi-Fi sink device substantially simultaneously with streaming the multimedia content according to the basic codec during the Wi-Fi display session. The control unit is configured for seamlessly continuing to stream the multimedia content to the at least one Wi-Fi sink device according to a codec format negotiated during the capability negotiation.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

The present invention provides a method and system for streaming multimedia content in a Wireless Fidelity (Wi-Fi) Display (WFD) network environment. In the following detailed description of the embodiments of the present invention, reference is made to the accompanying drawings that form a part hereof, and in which are shown by way of illustration specific embodiments in which the invention may be practiced. The drawings described herein are for illustration purposes only and are not intended to limit the scope of the present invention. These embodiments are described in sufficient detail to enable those skilled in the art to practice the present invention, and it is to be understood that other embodiments may be utilized and that changes may be made without departing from the scope of the present invention. The following detailed description is, therefore, not to be taken in a limiting sense, and the scope of the present invention is defined by the appended claims and their equivalents.

It is to be understood that the singular forms "a," "an," and "the" include plural referents unless the context clearly dictates otherwise. Thus, for example, reference to "a Wi-Fi" includes reference to one or more of such Wi-Fi devices.

Figure 1:
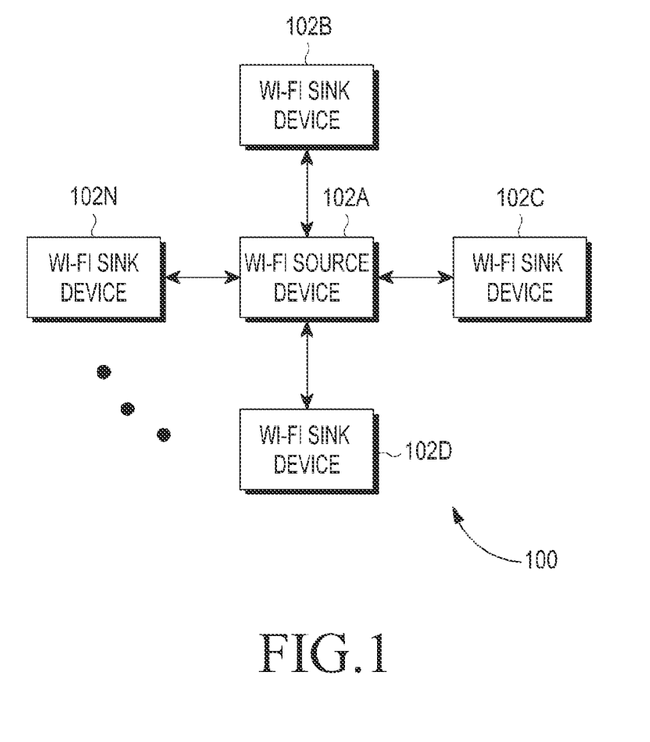
FIG. 1 is a block diagram of a Wireless Fidelity (Wi-Fi) Display (WFD) network environment, according to an embodiment of the present invention.

FIG. 1 is a block diagram of a Wireless Fidelity (Wi-Fi) Display (WFD) network environment 100, according to an embodiment of the present invention. The WFD network environment 100 includes a Wi-Fi source device 102A and Wi-Fi sink devices 102B-102N. The Wi-Fi source device 102A and Wi-Fi sink devices 102B-102N may be a portable terminal such as a smart phone, a notebook computer, a tablet, and the like, or an electronic device such as a Television (TV), a printer, a camera, and the like.

In an embodiment of the present invention, the Wi-Fi devices 102A-102N include a Wi-Fi module having a standard equal to or higher than Institute of Electrical and Electronics Engineers (IEEE) 802.11g (for example, 802.11g or 802.11n) and correspond to a Wi-Fi Direct certified device.

Figure 2A:
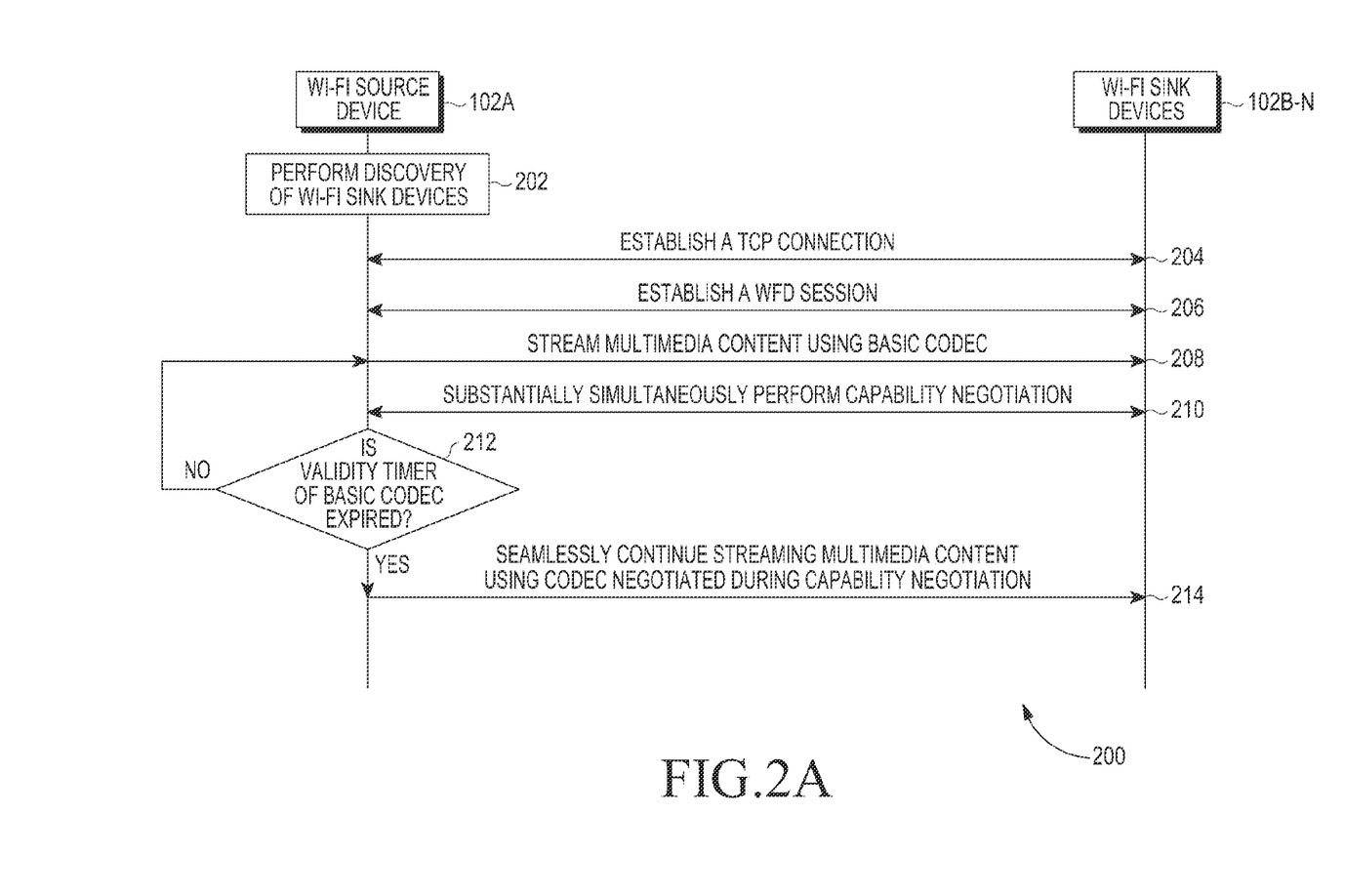
FIG. 2A is a flow diagram illustrating a method of streaming multimedia content to one or more Wi-Fi sink devices, according to an embodiment of the present invention.

FIG. 2A is a flow diagram 200 illustrating a method of streaming multimedia content to one or more Wi-Fi sink devices 102B-102N, according to an embodiment of the present invention. When a request for streaming multimedia content is received, at step 202, a Wi-Fi source device 102A performs a device discovery operation to discover one or more Wi-Fi sink devices 102B-102N. In some embodiments of the present invention, the Wi-Fi source device 102A broadcasts a probe request message indicating support for a basic codec format in the WFD network environment 100. The probe request message may indicate 'wfd-audio-codecs', 'wfd-video-formats' and/or 'wfd-3d-video-formats'. For example, the probe request message indicates 'wfd-audio-codecs' and 'wfd-video-formats' supported as Linear Pulse Code Modulation (LPCM) audio codec and H.264 CBP 3.1 video format, respectively. In response, one or more Wi-Fi sink devices 102B-102N send a probe response message acknowledging support for the basic codec format to the Wi-Fi source device 102A. The basic codec format is a codec format to be used for encoding and decoding multimedia content during a WFD session prior to negotiation of capability information. It can be noted that the Wi-Fi source device 102A may share the basic codec profile supported for streaming multimedia content with the one or more Wi-Fi sink devices 102B-102N during the service discovery phase.

In some cases, information exchanged between the Wi-Fi source device 102A and the Wi-Fi sink devices 102B-N during device discovery and that of service discovery are the same. Hence, in some embodiments of the present invention, the Wi-Fi source device 102A does not perform service discovery and share information during the device discovery phase.

At step 204, the Wi-Fi source device 102A establishes a Transport Control Protocol (TCP) connection with the one or more Wi-Fi sink devices 102B-102N. Upon successful establishment of the TCP connection, at step 206, the Wi-Fi source device 102A establishes a WFD session with the Wi-Fi sink devices 102B-102N. Here, the Wi-Fi source device 102A establishes a WFD session with the one or more Wi-Fi sink devices 102B-102N prior to exchange and negotiation of capability information with the one or more Wi-Fi sink devices 102B-102N.

At step 208, the Wi-Fi source device 102A streams multimedia content (e.g., video content) to the one or more Wi-Fi sink devices 102B-102N according to the basic codec format indicated in the probe request-response message. At step 210, which is performed substantially simultaneously to step 208, the Wi-Fi source device 102A performs capability negotiation with the one or more Wi-Fi sink devices 102B-102N. During the capability negotiation, the Wi-Fi source device 102A obtains capability information associated with the Wi-Fi sink devices 102B-102N. The capability information may include supported Audio Codecs, supported video formats, supported 3D formats, support for content protection, display Extended Display Identification Data (EDID), coupled sink status, client Real-time Transport Protocol (RTP) ports, Inter-Integrated Circuit (I²C) support, User Input Back Channel (UIBC) capability, standby-resume capability, and a connector type. Additionally, the capability information may include a validity timer (e.g., 60 seconds) indicating time period for which the basic codec profile is to be used.

At step 212, it is determined whether the validity timer for using the basic codec format expires. If the validity timer does not expire, the Wi-Fi source device 102A continues to stream the multimedia content according to the basic codec format during the ongoing WFD session similarly as step 208. If the validity timer does expire, at step 214, the Wi-Fi source device 102A seamlessly streams the multimedia content to the one or more Wi-Fi sink devices 102B-102N during the ongoing WFD session according to the codec format (e.g., audio codec and video formats) negotiated during the capability negotiation. In some embodiments of the present invention, the Wi-Fi source device 102A may employ more than one buffer for buffering multimedia content to be seamlessly streamed to the Wi-Fi sink devices 102B-102N. For example, the Wi-Fi source device 102A may employ a first buffer for buffering the multimedia content as per basic codec format and a second buffer for buffering the multimedia content as per codec format negotiated during the capability negotiation. In order to achieve seamless streaming of the multimedia content as per the negotiated codec format (i.e., without any user perceived delay), the Wi-Fi source device 102A starts buffering the multimedia content as per the negotiated codec format after the capability negotiation and before the expiry of the validity timer. Consequently, the Wi-Fi source device 102A continues to obtain the multimedia content from the second buffer but streams packets timed after the expiry of the validity timer so that the Wi-Fi sink devices 102B-102N seamlessly decode the packets containing the multimedia content as per the negotiated codec format using the negotiated codec.

It can be noted that, since the Wi-Fi source device 102A does not perform exchange and negotiation of the capability information after establishing the TCP connection, but directly establishes a WFD session and streams multimedia content, latency involved in establishing the WFD session and streaming multimedia content after the TCP connection is set up is significantly reduced.

Figure 2B:
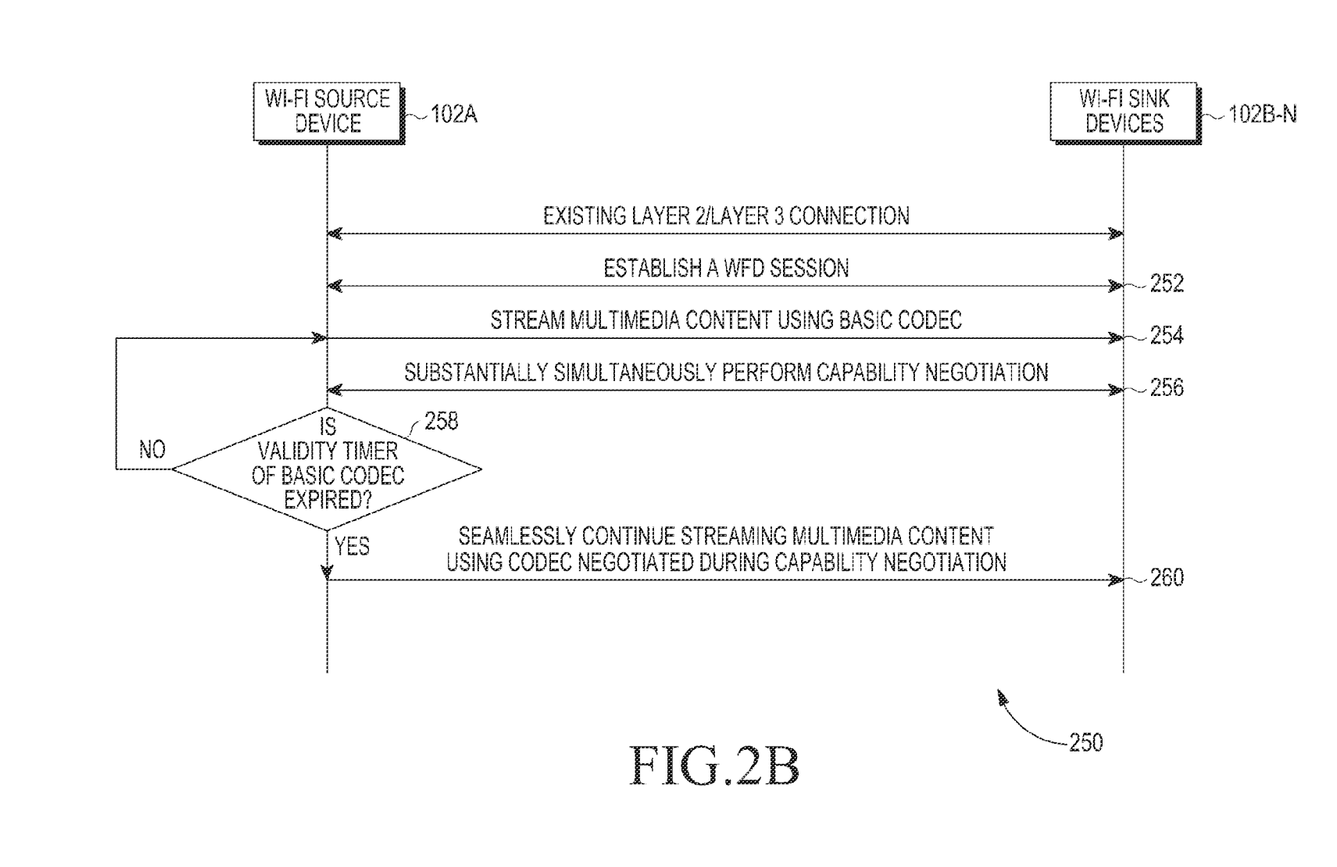
FIG. 2B is a flow diagram illustrating a method of streaming multimedia content to one or more Wi-Fi sink devices, according to an embodiment of the present invention.

FIG. 2B is a flow diagram 250 illustrating a method of streaming multimedia content to one or more Wi-Fi sink devices 102A-102N, according to an embodiment of the present invention. It can be seen that the process in steps 252 to 260 of FIG. 2B is similar to the process in steps 206 to 214 of FIG. 2A. Additionally, in FIG. 2B, the Wi-Fi source device 102A establishes a WFD session with the one or more Wi-Fi sink devices 102B—N based on an existing Layer 2 (L2)/Layer 3 (L3) connection (e.g., IP layer connection such as TCP connection). In other words, the Wi-Fi source device 102A does not perform the process in steps 202 and 204 of FIG. 2A, but reuses the ongoing L2/L3 connection between the Wi-Fi source device 102A and the one or more Wi-Fi sink devices 102B-102N. For example, when a user wishes to terminate the ongoing L2/L3 connection, the Wi-Fi source device 102A queries the user whether to maintain the ongoing L2/L3 connection with the one or more Wi-Fi sink devices 102B-102N for establishing a WFD session. If the user wishes to maintain the ongoing L2/L3 connection, the Wi-Fi source device 102A defers the termination of the ongoing L2/L3 connection and establishes the WFD session on the ongoing L2/L3 connection whenever the user wishes to stream multimedia content to the Wi-Fi sink devices 102B-102N. This can significantly reduce the amount of time required to perform the discovery operation (e.g., device discovery or service discovery) and establish a new L2/L3 connection prior to establishing a Wi-Fi session. Thus, the present invention enables faster streaming of multimedia content in the WFD network environment 100.

Figure 2C:
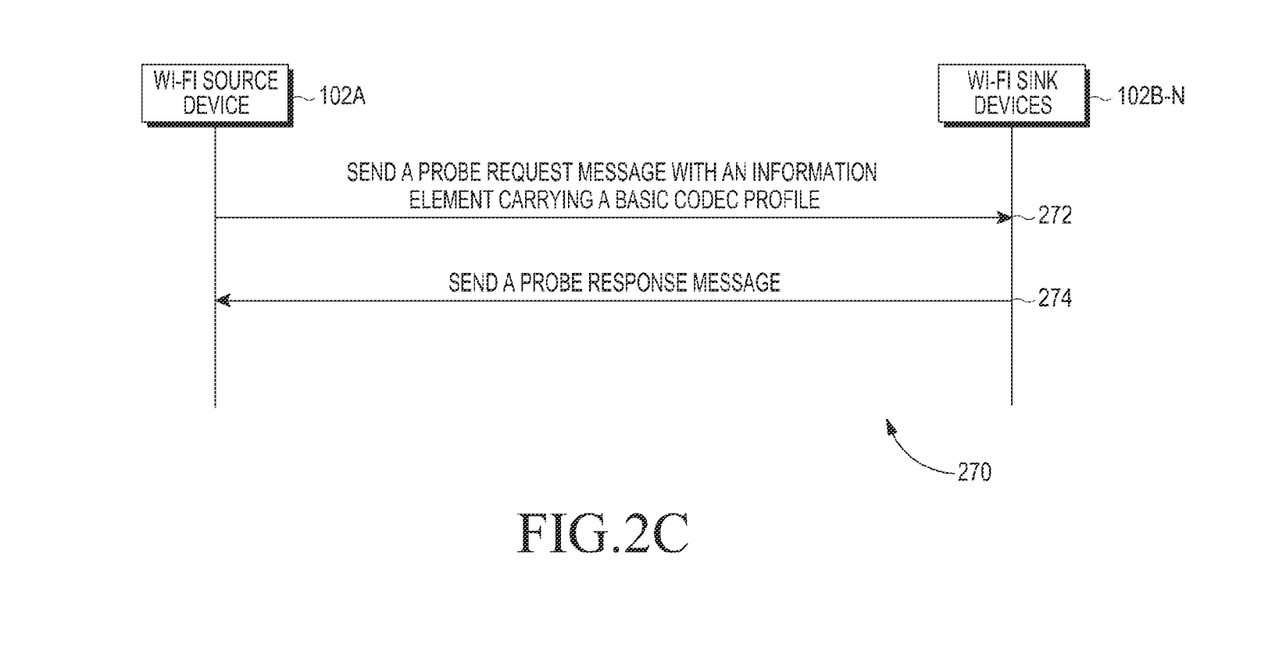
FIG. 2C is a flow diagram illustrating a method of sharing a basic codec during a device discovery phase, according to an embodiment of the present invention.

FIG. 2C is a flow diagram 270 illustrating a method of sharing a basic profile during the device discovery phase, according to an embodiment of the present invention. During the device discovery phase, at step 272, the Wi-Fi source device 102A broadcasts a probe request message including a WFD information element carrying basic codec profile. The basic codec profile includes a basic codec format to be used for streaming multimedia content until a preferred codec format is negotiated between the Wi-Fi source device 102A and the one or more Wi-Fi sink devices 102B-102N. The basic codec profile may include basic audio codec, a basic video format, a basic 3D video format, and/or s validity timer. For example, the basic codec profile indicates basic audio codec and a basic video format supported as LPCM audio codec and H.264 CBP 3.1 video format, respectively. It can be noted that the basic codec format is selected such that both the Wi-Fi source device 102A and the Wi-Fi sink devices 102B-102N support the basic codec format. The validity timer indicates a time period for which the basic codec format is valid during the WFD session. At step 274, the one or more Wi-Fi sink devices 102B-102N send a probe response message acknowledging the basic codec profile to the Wi-Fi source device 102A. Accordingly, the basic codec format is used for encoding and decoding multimedia content during a WFD session prior to the capability negotiation phase as shown in FIGS. 2A and 2B.

Figure 3:
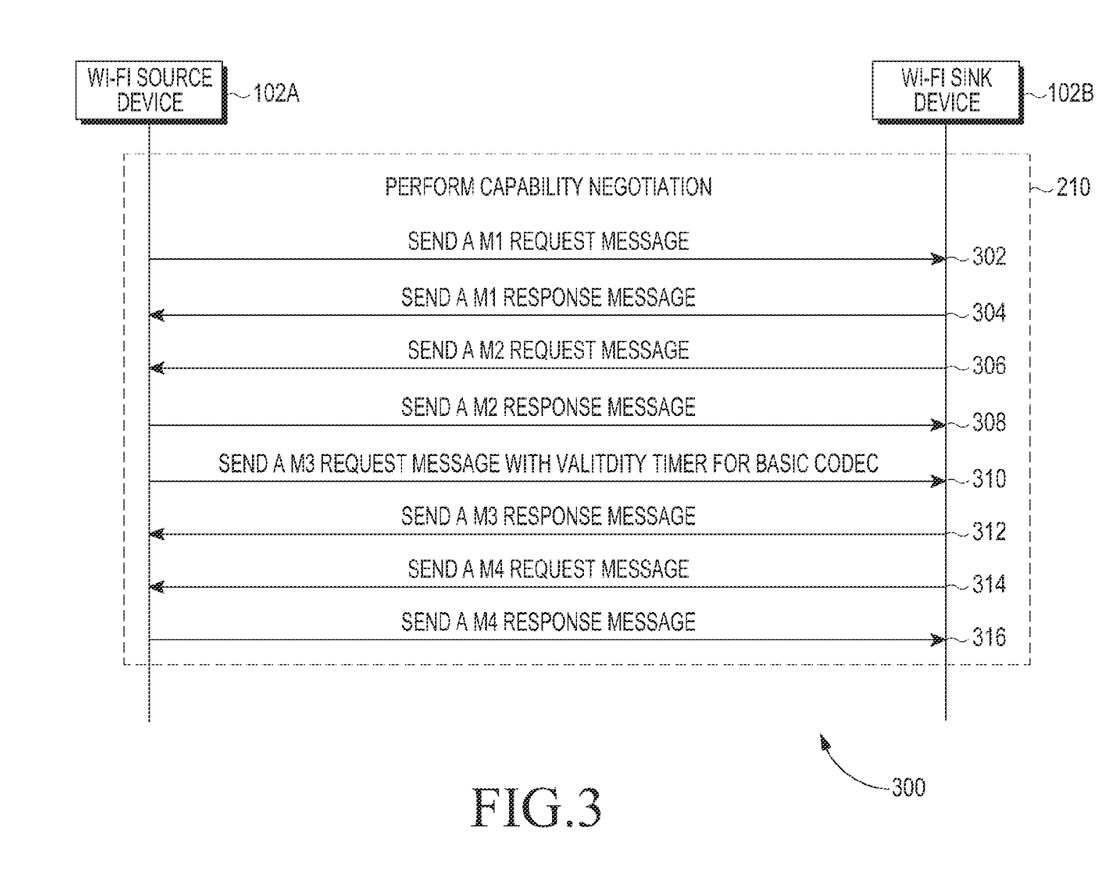
FIG. 3 is a flow diagram illustrating a method of performing capability negotiation in parallel to streaming multimedia content according to a basic codec format, according to an embodiment of the present invention.

FIG. 3 is a flow diagram 300 illustrating a method of performing capability negotiation in parallel to streaming multimedia content according to a basic codec format, according to an embodiment of the present invention. As described above, the Wi-Fi source device 102A performs capability negotiation with the one or more Wi-Fi sink devices 102B-102N substantially simultaneously with streaming the multimedia content using the basic codec profile. The capability negotiation phase includes exchange of M1 to M4 messages between the Wi-Fi source device 102A and the Wi-Fi sink devices 102B-102N. Here, the M1 to M4 messages are Real Time Streaming Protocol (RTSP) messages.

At step 302, the Wi-Fi source device 102A sends a M1 request message to obtain RTSP methods supported by a Wi-Fi sink device 102B to the Wi-Fi sink device 102B. At step 304, the Wi-Fi sink device 102B sends a M1 response message indicating RTSP methods supported by the Wi-Fi sink device 102B to the Wi-Fi source device 102A. At step 306, the Wi-Fi sink device 102B sends a M2 request message to obtain RTSP methods supported by the Wi-Fi source device 102A to the Wi-Fi source device 102A. At step 308, the Wi-Fi source device 102A sends a M2 response message indicating RTSP methods supported by the Wi-Fi source device 102A to the Wi-Fi sink device 102B.

At step 310, the Wi-Fi source device 102A sends a M3 request message to obtain capabilities of the Wi-Fi sink device 102B and indicating a validity timer for using the basic codec format to the Wi-Fi sink device 102B. At step 312, the Wi-Fi sink device 102B sends a M3 response message indicating capabilities of the Wi-Fi sink device 102B and acknowledging the validity timer for using the basic codec format to the Wi-Fi source device 102A. At step 314, the Wi-Fi sink device 102B sends a M4 request message to fix a set of parameters to be used during the ongoing WFD session to the Wi-Fi source device 102A. At step 316, the Wi-Fi source device 102A sends a M4 response message confirming fixing the set of parameters to be used during the ongoing WFD session to the Wi-Fi sink device 102B.

Figure 4:
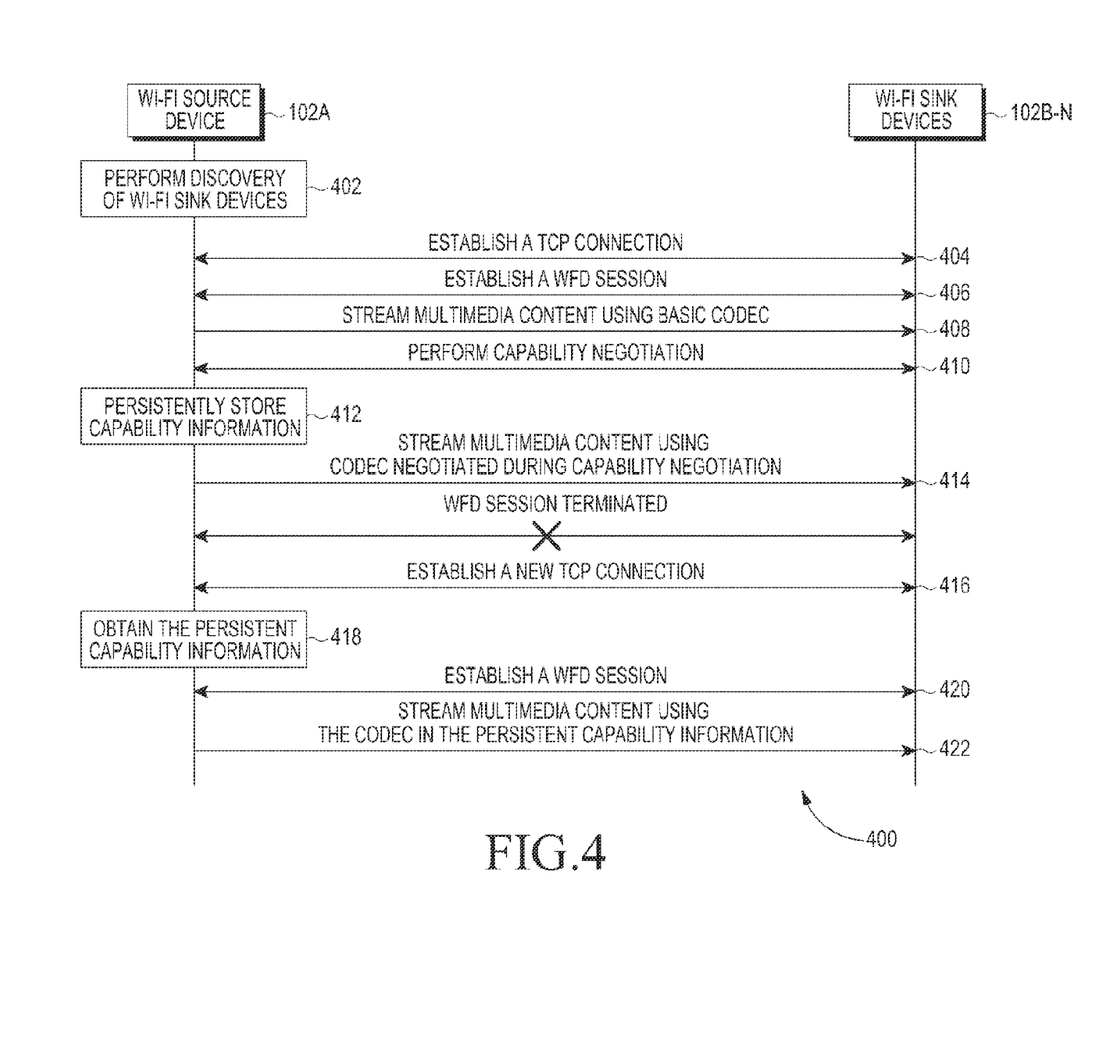
FIG. 4 is a process flowchart illustrating a method of streaming multimedia content to one or more Wi-Fi sink devices based on persistent capability information, according to another embodiment of the present invention.

FIG. 4 is a process flowchart 400 illustrating a method of streaming multimedia content to Wi-Fi sink devices 102B-102N based on persistent capability information, according to another embodiment of the present invention. When a request for streaming multimedia content is received, at step 402, a Wi-Fi source device 102A performs a device discovery operation to discover one or more Wi-Fi sink devices 102B-102N. At step 404, the Wi-Fi source device 102A establishes a TCP connection with the one or more Wi-Fi sink devices 102B-102N. Upon successful establishment of the TCP connection, at step 406, the Wi-Fi source device 102A establishes a WFD session with the Wi-Fi sink devices 102B-102N. Alternatively, if the TCP connection already exists, the Wi-Fi source device 102A establishes the WFD session on top of the existing TCP connection and no new TCP connection is established. Here, the Wi-Fi source device 102A establishes a WFD session with the one or more Wi-Fi sink devices 102B-102N prior to exchange and negotiation of capability information with the one or more Wi-Fi sink devices 102B-102N.

At step 408, the Wi-Fi source device 102A streams multimedia content (e.g., video content) to the one or more Wi-Fi sink devices 102B-102N according to a basic codec format indicated in probe request-response messages. At step 410, which is performed substantially simultaneously to step 408, the Wi-Fi source device 102A performs capability negotiation with the one or more Wi-Fi sink devices 102B-102N. During the capability negotiation, the Wi-Fi source device 102A obtains capability information associated with the Wi-Fi sink devices 102B-102N, which will be illustrated in more detail with reference to FIG. 5. The capability information may include supported Audio Codecs, supported video formats, supported 3D formats, support for content protection, display Extended Display Identification Data (EDID), coupled sink status, client Real-time Transport Protocol (RTP) ports, Inter-Integrated Circuit (I²C) support, User Input Back Channel (UIBC) capability, standby-resume capability, and a connector type. Additionally, the capability information may include a validity timer indicating a time period for which the basic codec format is to be used. It can be noted that, the step 410 is performed if the capability information negotiated during the previous Wi-Fi session establishment is not persistently stored at the Wi-Fi source device 102A. If the persistent capability information is present, then the step 410 is skipped and the process continues to step 414. At step 412, the Wi-Fi source device 102A persistently stores the capability information obtained at step 410. At step 414, the Wi-Fi source device 102A seamlessly continues to stream the multimedia content to the one or more Wi-Fi sink devices 102B-102N during the ongoing WFD session using the codec format (e.g., audio codec and video formats) negotiated during the capability negotiation at step 410. In some embodiments of the present invention, the Wi-Fi source device 102A determines whether a validity timer for using the basic codec format expires after successful capability negotiation. If the validity timer expires, the Wi-Fi source device 102A seamlessly continues to stream the multimedia content using the negotiated codec format. Until the expiry of the validity timer, the Wi-Fi source device 102A streams the multimedia content using the basic codec format.

When the WFD session is terminated and a user wishes to establish a new Wi-Fi session, at step 416, the Wi-Fi source device 102A establishes a new TCP connection with the one or more Wi-Fi sink devices 102B-102N. It can be noted that, at step 416, a new TCP connection is established if no ongoing TCP connection exists. If any idle TCP connection exists, the process 400 skips the step 416 and reuses the TCP connection for establishing a WFD session. This can save time involved in establishing a new TCP connection for the WFD session.

At step 418, the Wi-Fi source device 102A obtains the capability information persistently stored at step 412. In some embodiments of the present invention, the capability information persistently stored can be used for streaming the multimedia content for the pre-specified time duration. A timer may be set up at the beginning point of persistence of the capability information. When the multimedia content is to be streamed, the Wi-Fi source device 102A may determine whether the persistently stored capability information is valid based on whether the timer expires or not. If the timer expires, then the Wi-Fi source device 102A performs capability negotiation with the Wi-Fi sink devices 102B-102N (after establishing the WFD session and in parallel to streaming multimedia content using basic codec format) and persistently stores the capability information negotiated during the capability negotiation. If the timer does not expire, the persistent capability information is used at step 422.

At step 420, the Wi-Fi source device 102A establishes a WFD session with the one or more Wi-Fi sink devices 102B-102N. At step 422, the Wi-Fi source device 102A streams multimedia content using the codec format indicated in the persistent capability information (i.e., the codec format negotiated during the previous Wi-Fi session). It can be noted that, since the capability information is persistently stored, the Wi-Fi source device 102A need not perform capability negotiation with the one or more Wi-Fi sink devices 102B-102N for streaming multimedia content. This enables faster establishment of the WFD session and streaming of the multimedia content.

Figure 5:
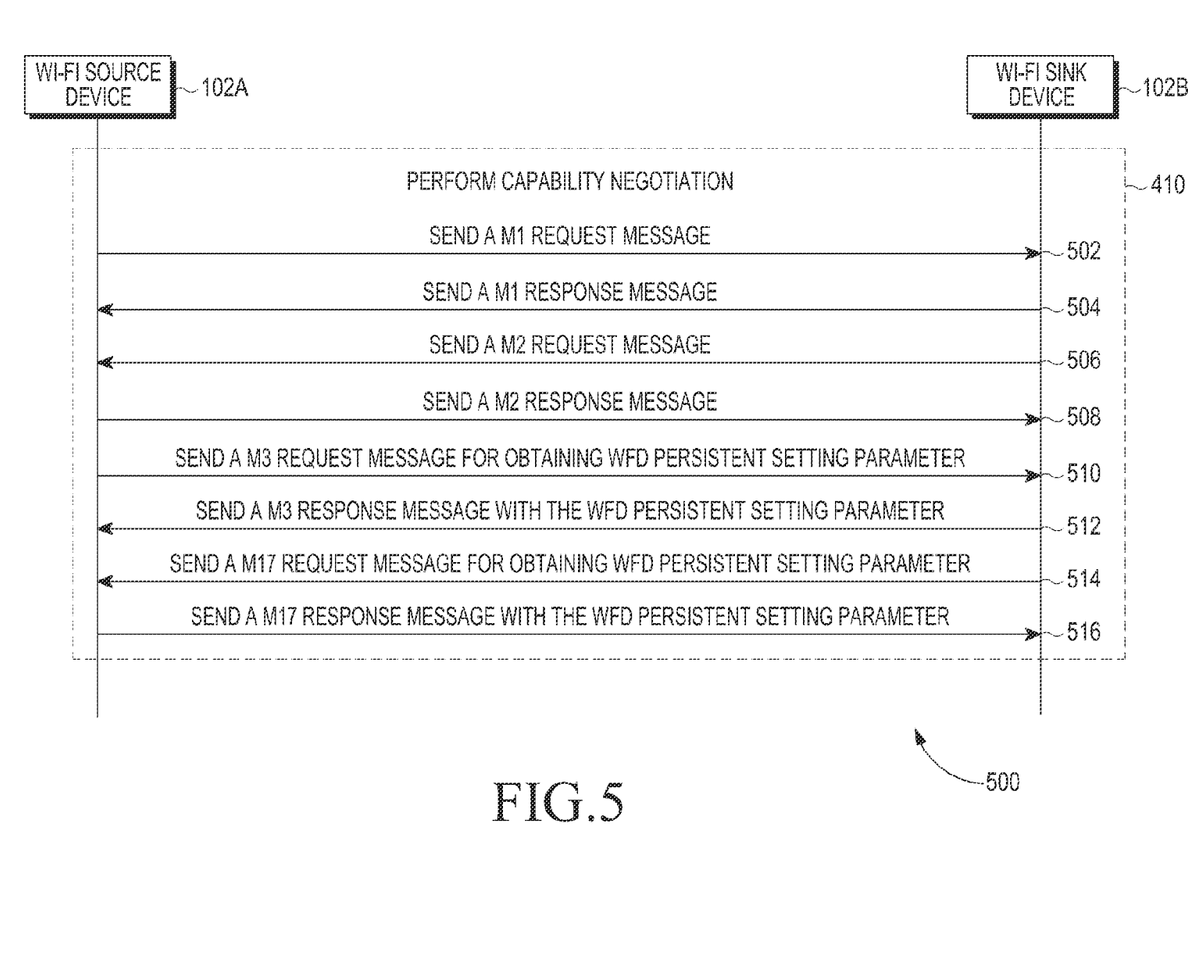
FIG. 5 is a flow diagram illustrating a method of performing capability negotiation in parallel to streaming of multimedia content according to a basic codec format, according to another embodiment of the present invention.

FIG. 5 is a flow diagram 500 illustrating a method of performing capability negotiation in parallel to streaming multimedia content according to a basic codec format, according to another embodiment of the present invention. At step 502, the Wi-Fi source device 102A sends a M1 request message to obtain RTSP methods supported by a Wi-Fi sink device 102B to the Wi-Fi sink device 102B. At step 504, the Wi-Fi sink device 102B sends a M1 response message indicating RTSP methods supported by the Wi-Fi sink device 102B to the Wi-Fi source device 102A. At step 506, the Wi-Fi sink device 102B sends a M2 request message to obtain RTSP methods supported by the Wi-Fi source device 102A to Wi-Fi source device 102A. At step 508, the Wi-Fi source device 102A sends a M2 response message indicating RTSP methods supported by the Wi-Fi source device 102A to the Wi-Fi sink device 102B.

At step 510, the Wi-Fi source device 102A sends a M3 request message with a WFD persistent setting parameter to obtain persistent capability of the Wi-Fi sink device 102B to the Wi-Fi sink device 102B. At step 512, the Wi-Fi sink device 102B sends a M3 response message indicating persistent capability of the Wi-Fi sink device 102B to the Wi-Fi source device 102A. At step 514, the Wi-Fi sink device 102B sends a M17 request message with a WFD persistent setting parameter to obtain persistence capability of the Wi-Fi source device 102A to the Wi-Fi source device 102A. At step 516, the Wi-Fi source device 102A sends a M17 response message indicating the persistent capability of the Wi-Fi source device to the Wi-Fi sink device 102B.

Figure 6:
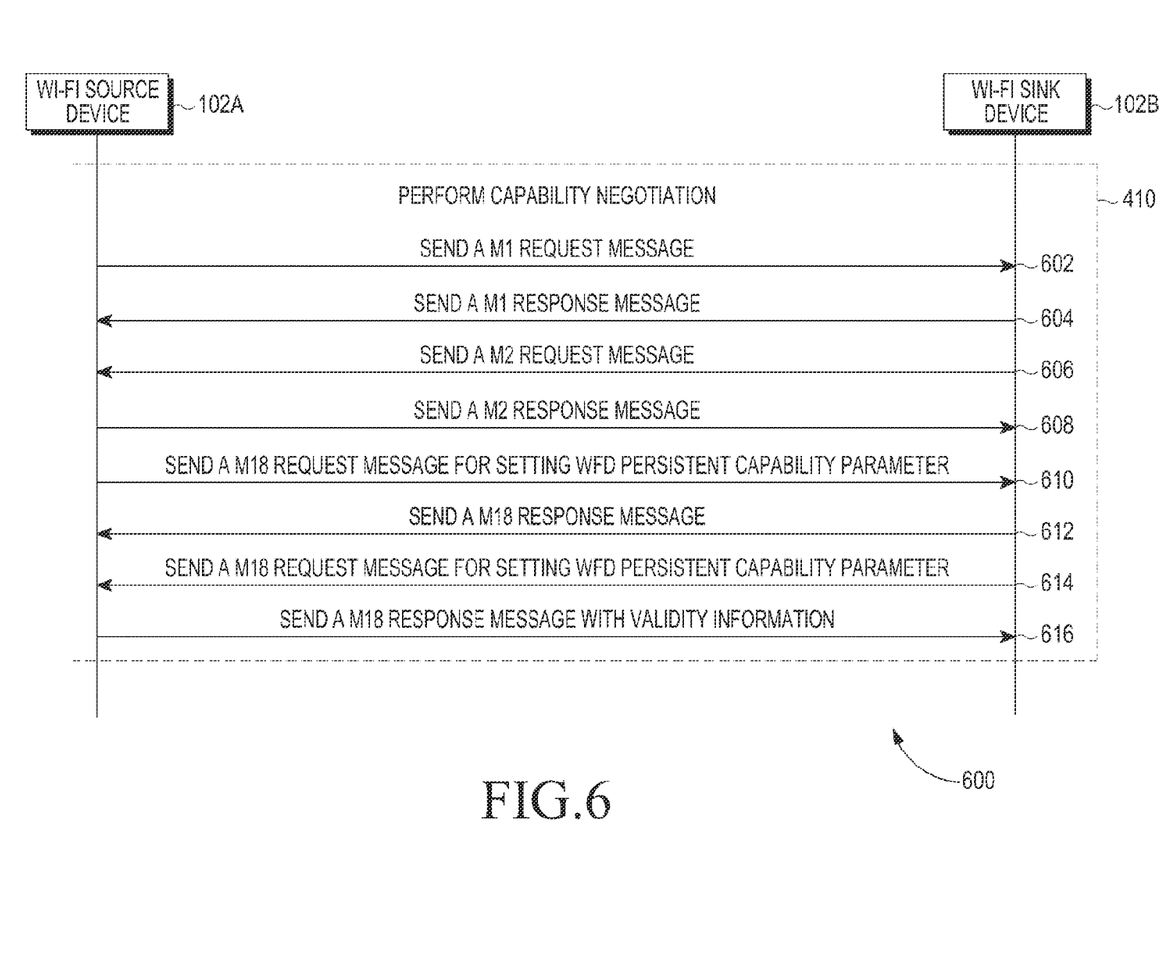
FIG. 6 is a flow diagram illustrating a method of performing capability negotiation in parallel to streaming multimedia content according to a basic codec format, according to yet another embodiment of the present invention.

FIG. 6 is a flow diagram 600 illustrating a method of performing capability negotiation in parallel to streaming multimedia content according to a basic codec format, according to yet another embodiment of the present invention. At step 602, the Wi-Fi source device 102A sends a M1 request message to obtain RTSP methods supported by a Wi-Fi sink device 102B to the Wi-Fi sink device 102B. At step 604, the Wi-Fi sink device 102B sends a M1 response message indicating RTSP methods supported by the Wi-Fi sink device 102B to the Wi-Fi source device 102A. At step 606, the Wi-Fi sink device 102B sends a M2 request message to obtain RTSP methods supported by the Wi-Fi source device 102A to the Wi-Fi source device 102A. At step 608, the Wi-Fi source device 102A sends a M2 response message indicating RTSP methods supported by the Wi-Fi source device 102A to the Wi-Fi sink device 102B.

At step 610, the Wi-Fi source device 102A sends a M18 request message with a WFD persistent setting parameter to determine whether the persistent capability of the Wi-Fi sink device 102B is enabled or disabled to the Wi-Fi sink device 102B. At step 612, the Wi-Fi sink device 102B sends a M18 response message indicating whether the persistent capability is enabled or disabled at the Wi-Fi sink device 102B to the Wi-Fi source device 102A. At step 614, the Wi-Fi sink device 102B sends a M18 request message with a WFD persistent setting parameter to determine whether the persistent capability of the Wi-Fi source device 102A is enabled or disabled to the Wi-Fi source device 102A. At step 616, the Wi-Fi source device 102A sends a M18 response message indicating whether the persistent capability is enabled or disabled at the Wi-Fi source device 102A along with validity information to the Wi-Fi sink device 102B.

Figure 7:
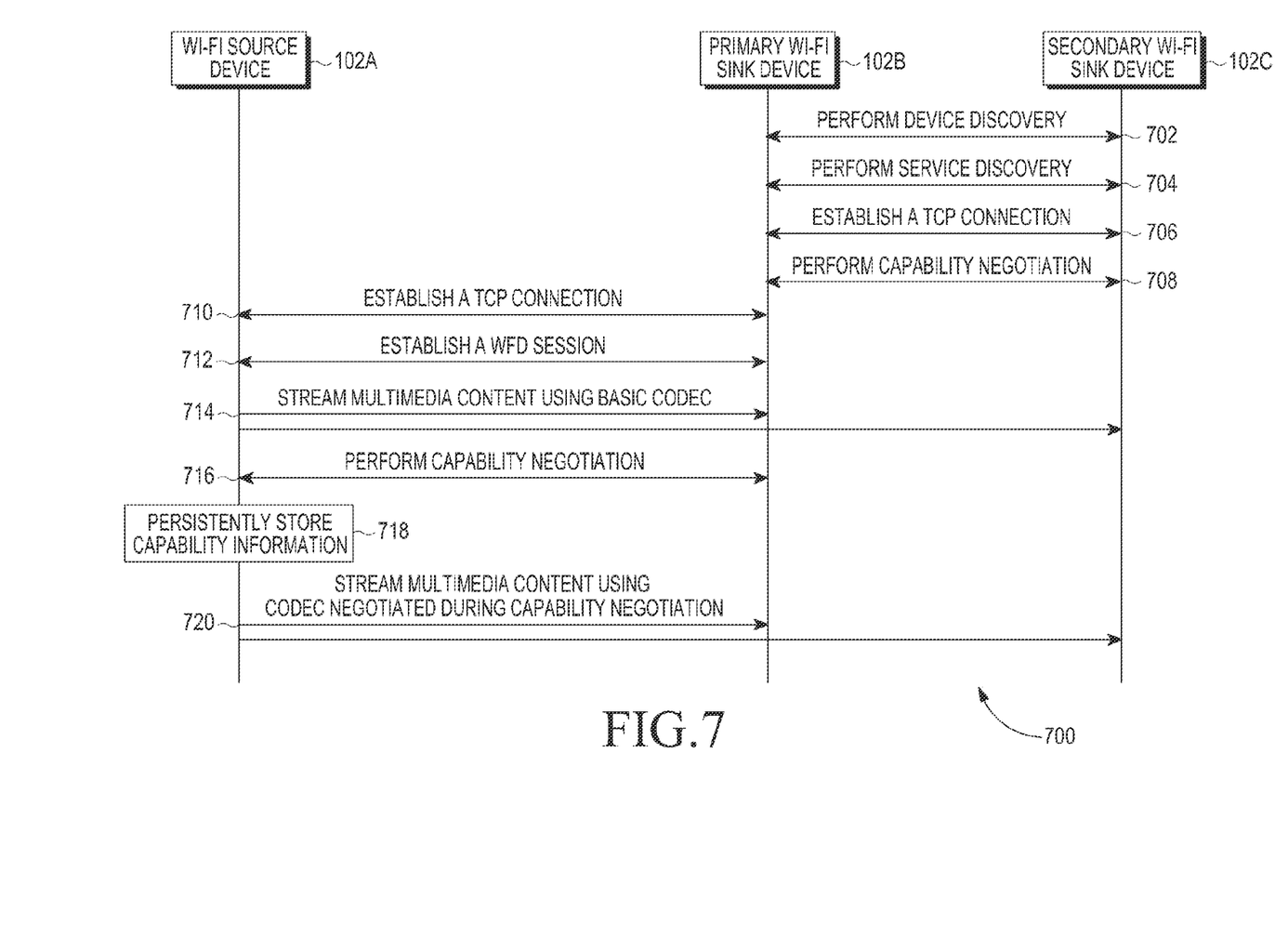
FIG. 7 is a flow diagram illustrating a method of streaming multimedia content to one or more Wi-Fi sink devices in a coupled sink operation, according to yet another embodiment of the present invention.

FIG. 7 is a flow diagram 700 illustrating a method of streaming multimedia content to one or more Wi-Fi sink devices 102B-102N in a coupled sink operation, according to yet another embodiment of the present invention. At step 702, a primary Wi-Fi sink device 102B performs device discovery to discover any secondary Wi-Fi sink device 102C in the WFD network environment 100. At step 704, the primary Wi-Fi sink device 102B performs service discovery to determine service capabilities of the secondary Wi-Fi sink device 102C. At step 706, the primary Wi-Fi sink device 102B establishes a TCP connection with the secondary Wi-Fi sink device 102C. At step 708, the primary Wi-Fi sink device 102B performs capability negotiation with the secondary Wi-Fi sink device 102C. During capability negotiation, the primary Wi-Fi sink device 102B obtains capability information associated with the secondary Wi-Fi sink device 102C.

When a Wi-Fi source device 102A wishes to establish a WFD session with the primary Wi-Fi sink device 102B and the secondary Wi-Fi sink device 102C, the Wi-Fi source device 102A performs capability negotiation with the primary Wi-Fi sink device 102B to obtain the capability information of the primary Wi-Fi sink device 102B and the secondary Wi-Fi sink device 102C as the primary Wi-Fi sink device 102B has the capability information of the secondary Wi-Fi sink device 102C obtained at step 708. Here, the steps 710 to 720 involved in streaming the multimedia content to the primary Wi-Fi sink device 102B and the secondary Wi-Fi sink device 102C are similar to the steps 404 to 414 of FIG. 4, except that FIG. 7 illustrates a coupled sink operation. That is, in each of steps 710 to 720, the operation performed between the Wi-Fi source device 102A and the primary Wi-Fi sink device 102B includes a similar performance between the Wi-Fi source device 102A and the secondary Wi-Fi sink device 102C.

Figure 8:
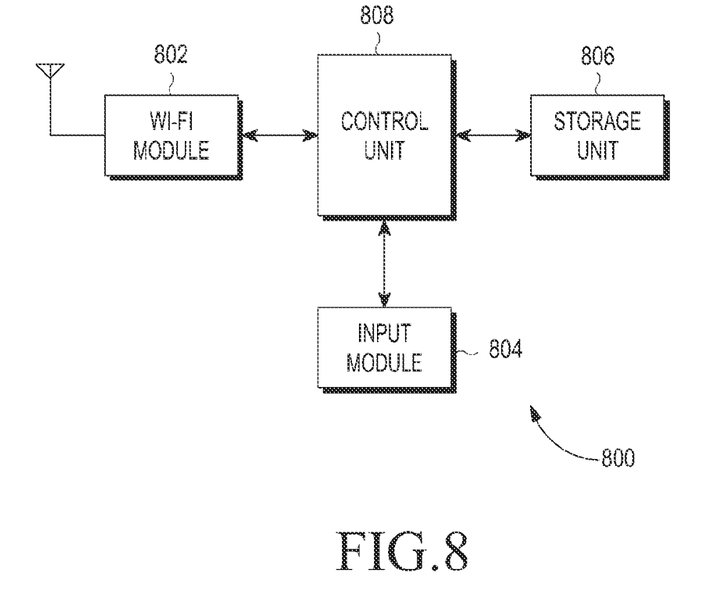
FIG. 8 is a block diagram of a configuration of a Wi-Fi device in the WFD network environment of FIG. 1, according to an embodiment of the present invention.

FIG. 8 is a block diagram of a Wi-Fi device 800 in the WFD network environment 100 of FIG. 1, according to an embodiment of the present invention. It is appreciated that the Wi-Fi devices 102A-102N may have the same configuration as that of the Wi-Fi device 800. The Wi-Fi device 800 includes a Wi-Fi module 802, an input unit 804, a storage unit 806, and a control unit 808. Although not shown, according to the type of the Wi-Fi device, the Wi-Fi device 800 may further include various components, such as a display unit for screen data displaying, a radio frequency unit for mobile communication, an audio processing unit including a microphone and a speaker, a camera module for taking photographs, a digital broadcast receiving module for Digital Multimedia Broadcasting (DMB) or Digital Video Broadcasting (DVB), and a Bluetooth module for Bluetooth communication. These additional components are not described further for conciseness.

The Wi-Fi module 802 supports Internet Protocol (IP) based wireless communication for the Wi-Fi device 800 and is configured for transmitting or receiving multimedia content. The input unit 804 generates an input signal corresponding to a user action and sends the input signal to the control unit 808. The input unit 804 may include a plurality of keys. In particular, the input unit 804 may include one or more buttons for generating an input signal to execute a Wi-Fi based function such as a WPS feature for a connection setup between Wi-Fi devices 102A-102N. Alternatively, the input unit 804 may include a touch sensitive display capable of generating an input signal corresponding to a user action (e.g., tap, swipe, hover, etc).

The storage unit 806 stores various programs and information for the Wi-Fi device 800. The storage unit 806 may be composed of one or more volatile memories and non-volatile memories. For example, the storage unit 806 may store an operating system of the Wi-Fi device 800, a program and discovery information for establishing a WFD connection (e.g., Wi-Fi direct peer-to-peer (P2P) or tunneled direct link setup (TDLS) connection), a program and data for capability exchange and negotiation, a program and data for establishing a WFD session with one or more Wi-Fi devices, a program and data for streaming multimedia content, and a program and data for controlling exchange of information on supported functions. Such programs and data may be stored semi-permanently or temporarily. Further, the storage unit 806 may consist of a first buffer for buffering multimedia content as per basic codec format and a second buffer for buffering multimedia content as per codec negotiated during capability negotiation.

The control unit 808 controls the overall operation of the Wi-Fi device 800. More particularly, the control unit 808 controls an operation to provide faster establishment of the WFD session with other Wi-Fi devices and seamlessly streaming multimedia content using basic codec and preferred codec. The control unit 808 may be capable of executing a program and data stored in the storage unit 806 to perform steps illustrated in FIGS. 2A-7. For example, the control unit 808 is configured for establishing a WFD session with at least one Wi-Fi device prior to capability negotiation and streaming multimedia content using basic codec to the Wi-Fi device during the WFD session. The control unit 808 is also configured for performing capability negotiation with the Wi-Fi device in parallel to streaming the multimedia content using the basic codec and seamlessly continuing to stream multimedia content using codec negotiated during the capability negotiation.

The role of the control unit 808 is described further in relation to operation control. In addition, the control unit 808 may control regular operations of the Wi-Fi device 800. For example, when an application using mobile communication is executed, the control unit 808 may control operations related to mobile communication. When an application using a local network is executed, the control unit 808 may control operations related to local networking.

The Wi-Fi device 800 of an embodiment of the present invention may be any form of information and communication appliance, such as a mobile communication terminal supporting a communication protocol for a communication system, a smart phone, a Portable Multimedia Player (PMP), a digital broadcast receiver, a Personal Digital Assistant (PDA), a music player such as a Moving Picture Experts Group (MPEG)-1 or MPEG-2 audio layer 3 (MP3) player or a portable game console. The Wi-Fi device 800 of an embodiment of the present invention may be applied to medium to large sized devices such as a television set, a large format display, digital signage, a media kiosk, a personal computer, a laptop, a printer, a multifunction office machine, etc.

Furthermore, the various devices, modules, and the like described herein may be enabled and operated using hardware circuitry, for example, complementary metal oxide semiconductor based logic circuitry, firmware, software, and/or any combination of hardware, firmware, and/or software embodied in a machine readable medium. For example, the various electrical structures and methods may be embodied using transistors, logic gates, and electrical circuits, such as application specific integrated circuits.

The present invention has been described with reference to specific embodiments of the present invention; it will be evident that various modifications and changes may be made to these embodiments without departing from the spirit and scope of the present invention as defined by the appended claims and their equivalents.

The invention claimed is:

1. A method of streaming multimedia content in a wireless network environment, the method comprising:
   discovering, by a second device, at least one first device and transmitting an information element comprising at least one basic codec format;
   establishing a display session with the at least one first device by the second device prior to capability negotiation with the at least one first device;
   streaming multimedia content to the at least one first device using a basic codec format among the at least one basic codec format during the display session while performing capability negotiation with the at least one first device simultaneously; and
   seamlessly continuing to stream the multimedia content to the at least one first device using a codec format negotiated during the capability negotiation,
   wherein a first part of the multimedia content is buffered using the basic codec format in a first buffer before expiry of a validity timer of the basic codec format, and a second part of the multimedia content is buffered using the negotiated codec format in a second buffer before the expiry of the validity timer.

2. The method of claim 1, further comprising:
   establishing a layer 2 connection with the at least one first device.

3. The method of claim 1, wherein establishing the display session with the at least one first device comprising:
   deferring termination of an ongoing layer 2 or layer 3 connection when a request to establish the display session with the at least one first device is received; and
   establishing the display session with at least one first device by the second device on the ongoing layer 2 or layer 3 connection.

4. The method of claim 1, wherein the information element further comprises a validity timer associated with the at least one basic codec format.

5. The method of claim 1, wherein seamlessly continuing to stream the multimedia content to the at least one first device using the codec format negotiated during the capability negotiation comprising:
   determining whether the validity timer for using the basic codec format expires;
   obtaining the multimedia content as per the codec format negotiated during the capability negotiation from a second buffer if the validity timer for using the basic codec format expires; and
   seamlessly continuing to stream the obtained multimedia content as per the negotiated codec format to the at least one first device.

6. The method of claim 1, further comprising:
   persistently storing capability information obtained during performing the capability negotiation with the at least one first device.

7. The method of claim 6, further comprising:
   using the persistently stored capability information for streaming the multimedia content during a new display session with the at least one first device.

8. The method of claim 1, further comprising:
   persistently storing capability information associated with a secondary first device by a primary first device during a coupling procedure; and
   transmitting a message indicating the capability information associated with the secondary first device during the capability negotiation.

9. An apparatus comprising:
   a processor configured to control to:
      discover at least one first device,
      transmit an information element comprising at least one basic codec format,
      establish a display session with the at least one first device prior to capability negotiation with the at least one first device,
      stream multimedia content to the at least one first device according to a basic codec format among the at least one basic codec format during the display session while performing capability negotiation with the at least one first device simultaneously, and
      seamlessly continue to stream the multimedia content to the at least one first device according to a codec format negotiated during the capability negotiation,
   wherein a first part of the multimedia content is buffered using the basic codec format in a first buffer before expiry of a validity timer of the basic codec format, and a second part of the multimedia content is buffered using the negotiated codec format in a second buffer before the expiry of the validity timer.

10. The apparatus of claim 9, wherein the processor is further configured to establish a layer 2 connection with the at least one first device.

11. The apparatus of claim 9, wherein the processor is further configured to:
   defer termination of an ongoing layer 2or layer 3 connection when a request to establish the display session with the at least one first device is received; and
   establish the display session with the at least one first device by the second device on the ongoing layer 2 or layer 3 connection.

12. The apparatus of claim 9, wherein the information element further comprises a validity timer associated with the at least one basic codec format.

13. The apparatus of claim 9, wherein processor is further configured to:
   determine whether the validity timer for using the basic codec format expires;
   obtain the multimedia content as per the codec format negotiated during the capability negotiation from a second buffer if the validity timer for using the basic codec format expires; and
   seamlessly continue to stream the obtained multimedia content as per the negotiated codec format to the at least one first device.

14. The apparatus of claim 9, wherein the processor is further configured to persistently store capability information obtained during performing the capability negotiation with the at least one first device.

15. The apparatus of claim 14, wherein the processor is further configured to use the persistently stored capability information for streaming the multimedia content during a new display session with the at least one first device.

16. The apparatus of claim 9, wherein the processor is configured to:
   persistently store capability information associated with a secondary first device by a primary first device during a coupling procedure; and
   transmit a message indicating the capability information associated with the secondary first device during the capability negotiation.

* * * * *